Aug. 21, 1945.  C. R. HANNA ET AL  2,383,306
PHASE-RESPONSIVE GOVERNOR SYSTEM
Filed Sept. 15, 1943   3 Sheets-Sheet 1

WITNESSES:

INVENTORS
Clinton R. Hanna and
William O. Osbon.
BY
Paul E. Friedemann
ATTORNEY

Patented Aug. 21, 1945

2,383,306

UNITED STATES PATENT OFFICE 2,383,306

PHASE-RESPONSIVE GOVERNOR SYSTEM

Clinton R. Hanna and William O. Osbon, Pittsburgh, Pa., assignors to Westinghouse Electric Corporation, East Pittsburgh, Pa., a corporation of Pennsylvania Application September 15, 1943, Serial No. 502,489

19 Claims. (Cl. 290—4)

The invention relates to prime mover-alternator units and more particularly to automatic governor systems for units whose alternator serves for energizing an alternating current line also fed from other alternators.

The prime mover of a generator set of this type is as a rule provided with a governor which controls the admission valve of the prime mover in dependence upon its speed of rotation, a centrifugal pressure control device such as a flyweight regulator or speed-responsive pressure pump being customarily used for varying the adjustment of the pilot valve of a hydraulic servomotor acting on the admission valve.

It is also well known and general practice to synchronize a turboalternator by matching the frequency of the incoming machine with that of the line, equalizing the voltages and then closing the connecting switch when the phase angle between the two voltages is zero. The turboalternator is conditioned to take load by an adjustment of the above-mentioned governor speed control which tends to make the turbine run faster. By virtue of a drooping speed-torque characteristic of the prime mover, the load can be adjusted to a prescribed value. This customary method of control by speed-responsive regulation has the disadvantage that when the load is suddenly removed from the alternator due to a fault, the speed increases and the set must be resynchronized before it can again be connected to the line.

It is an object of the invention to reduce or eliminate the above-mentioned disadvantage of the known prime mover-alternator units. More particularly, the invention aims at an improved governor system for such units which affords an automatic synchronization when connecting the unit to the line to be fed or after the occurrence of faults. It is also an object, allied to the foregoing, to afford an improved division of the load on several prime mover-alternators feeding the same line. An object is further to improve the system stability of the line.

Still another object of the invention is to provide a governing system for turboalternators or other prime mover-generators which permits superposing on the speed-responsive control of the admission valve another control effect dependent upon some other condition essential to the operation of the generator or the line fed thereby. More particular objects of the invention related to this aspect deal with the provision for the above-mentioned purposes of governor systems distinguished by an operation of high accuracy, low retardation, and low tendency of hunting. Other more specific objects involve the provision of electric measuring and control circuits for effecting a control of the prime-mover admission valve in dependence upon line conditions. These objects will become apparent and will be more clearly understood from the following description, particularly from the explanation given hereinafter in conjunction with the appertaining drawings.

According to the invention, the governor system controlling the admission valve of a prime mover-alternator is designed to respond to the phase angle between the alternator voltage or a pilot voltage representative of the alternator voltage, and a reference voltage, the latter being preferably the line voltage or representative of the line voltage.

According to another, more specific feature of the invention, an electric measuring network is used for producing the phase-dependent governing effect, this network being connected with both the alternator and the line so as to measure, and react upon, the phase difference between the alternators and line voltages.

In another aspect, the invention consists in superposing a phase-angle responsive, or the like electric control, on a speed-responsive control of the admission valve so that the latter is actuated in accordance with the resultant control effect of these two variable control magnitudes.

Still another feature of the invention related to those already mentioned but also applicable for other uses, is the provision of hydraulic governors in which the pilot valve of a servomotor for actuating the admission valve of a prime mover is connected with two independently operating governing devices proper, i. e., a centrifugal speed-responsive relay governor and an electrically actuated second governor or control device.

The drawings represent several embodiments of the invention.

Fig. 2 is a circuit diagram showing the same unit schematically, together with electric circuit and control means applicable for the operation of the unit.

Figs. 3 through 6 are vector diagrams representing the voltage and torque relations occurring in a control system according to Figs. 1 and 2 and serve also to elucidate the operation of the modified embodiment shown in Fig. 7.

The circuit diagram illustrated in Fig. 7 relates to a control system substantially similar to that of Fig. 2 but involving also the feature of a remote phase control.

Figure 1:
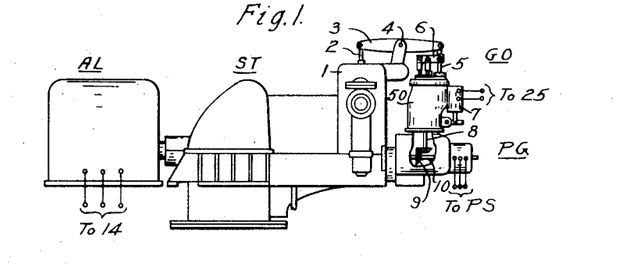
Figure 1 is a side elevation, in diagrammatic form, of a turboalternator set with a governing system according to the invention.

Referring to Fig. 1, a steam turbine ST has its shaft connected with an alternating current generator AL for driving the latter. The steam chest 1 of the turbine contains the control or admission valve means actuated by a vertical valve stem 2. The stem is journaled to a control lever 3 whose stationary fulcrum is denoted by 4. The other end of the lever 3 is connected to the piston rod 5 of a servomotor which forms part of the turbine governor GO. The servomotor is controlled by two different control devices. One of these devices operates in dependence upon the phase angle of the alternating generated voltage of the alternator AL relative to a reference voltage, while the other control is effected in dependence upon the speed of the turbine or the rate of change of the aforementioned phase angle. The actuating member of the phase-responsive control consists of a solenoid 7 which is attached to the housing 50 of the governing apparatus GO. The speed-responsive control means of the governor are actuated from a governor shaft 8 which is driven over a bevel gear 9 from the turbine and alternator shaft 10. A pilot generator PG has its armature mounted on or connected with the turbine shaft 10 to provide an alternating output voltage whose phase is the same as that of the alternator generated voltage.

Figures 2, 3, 4, 5, 6, 7:
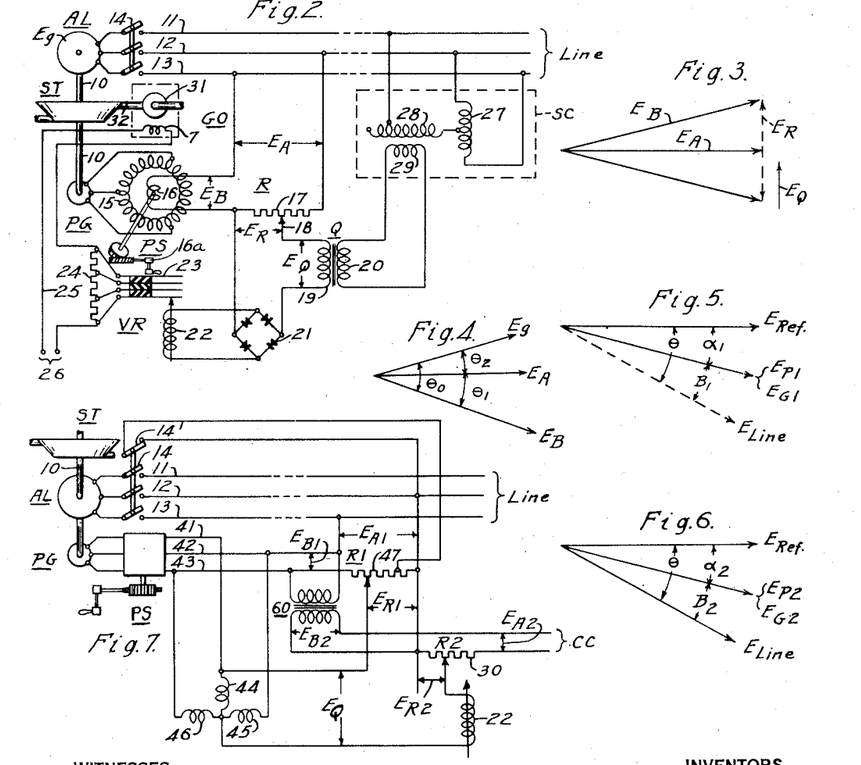

According to Fig. 2, the alternator AL has its output terminals connected with mains 11, 12 and 13 of the line to be fed, a switch 14 being interposed between the alternator and the line. The pilot generator PG is connected to the primary windings 15 of a phase shifter PS whose secondary 16 is connected across leads 12 and 13 of the line over the resistor 17 of a potentiometer rheostat R. The phase shifter is provided with any suitable means, such as diagrammatically indicated at 16A, by which the primary and secondary elements 15 and 16 may be relatively adjusted or shifted angularly. The secondary or output voltage of the potentiometer can be varied by displacing its slider 18. The potentiometer output circuit is connected through the secondary 19 of a transformer Q to a rectifier arrangement 21 whose direct-current terminals are connected to the actuating coil 22 of a voltage regulator VR.

The voltage regulator is illustrated as having a number of contact members 23 connected to corresponding taps of a regulating resistor 24. The contact members 23 are actuated by the regulator coil 22 so as to short-circuit an increasing number of sections of resistor 24 with increasing energization of coil 22. The voltage regulator may consist of a unit of the type known under the trade name Silverstat as described in United States Patent 2,249,826 issued July 22, 1941, to C. R. Hanna. However, any other type of voltage regulator serving the purpose of varying a voltage or a resistance in dependence upon an energizing voltage or current can be used instead.

The resistor 24 is arranged in a circuit 25 which is fed at 26 from a constant current source, for instance, of 110-volt direct current. The circuit is connected to the solenoid 7 of the governing apparatus GO. The coil 7 controls the admission valve 31 of the turbine ST so as to regulate the flow of steam through the admission conduit 32 into the turbine. That is, the torque which the turbine can develop depends upon the adjustment of the admission valve 31 and hence on the energization of coil 7 controlled by the voltage regulator. Consequently, the turbine torque is ultimately dependent upon the energization of the regulator coil 22.

The primary 20 of the transformer Q is connected to the secondary winding 29 of a Scott-connected transformer arrangement SC whose primaries 27 and 28 are connected with the line as apparent from the illustration.

In order to facilitate understanding the following explanation of the operation of the control system, reference will be had to the vector diagrams of Figs. 3 through 6 in conjunction with the voltage notations $E_A$, $E_B$, $E_R$, $E_Q$ and $E_g$ entered in Fig. 2 and representing the voltage components which appear between the leads or points indicated by the corresponding double-headed arrows. $E_g$ is the generated voltage of the alternator which differs from $E_A$ when the generator is delivering load by a phase angle and an amount which depend upon the load and the internal impedance of the generator. This voltage is an internal voltage so that it cannot be utilized directly. The rotor of pilot generator PG is oriented with respect to the rotor of the alternator AL so that the voltage of the former has the same phase as $E_g$. The pilot generator voltage therefore is representative of $E_g$.

It will be seen from Fig. 2 that the secondary 16 of the phase shifter PS is connected in series with one phase of the line in such a manner that the vector difference between the two voltages $E_A$ and $E_B$ appears across the output terminals of potentiometer R. With $E_A$ and $E_B$ approximately equal, the difference voltage $E_R$ is approximately at right angles to $E_A$ and $E_B$, and has one polarity when $E_B$ leads $E_A$ and the opposite polarity when $E_B$ lags (see Fig. 3). When $E_A$ and $E_B$ are in phase, $E_R$ is zero. Thus $E_R$ is a measure of the phase angle between the two voltages. In order to sense its direction, however, it is necessary to combine it with a quadrature voltage $E_Q$ obtained from the line or from the phase shifter. The purpose of the illustrated Scott-connected transformer set SC is to supply such a quadrature voltage from the line. As is apparent from Fig. 3, $E_R$ adds to $E_Q$ when $E_B$ leads $E_A$ and subtracts from it when $E_B$ lags behind $E_A$. The resultant voltage $E_R$ plus $E_Q$ is applied to the rectifier set 21 and appears as a corresponding direct current magnitude in the control coil 22 of the voltage regulator. The average value of energizing current effective in the regulator is thus proportional to $E_Q$ and its variations above and below this value in proportion to the phase angle deviations.

The control impulses thus supplied to control coil 22 have the ultimate effect of advancing or retarding the turbine and hence of shifting the phase of the alternating voltage generated by the pilot generator PG. The connection is of such nature as to reduce the voltage $E_B$ which produces the control impulses. The system thus tends to regulate for zero phase angle between $E_A$ and $E_B$.

With the speed control of the turbine, effected by speed-changer adjustment of the governor, set for normal frequency at no load, the machine, when brought up to speed, will be regulated automatically at the exact frequency of the system. It can then be connected to the line directly, provided the phase of the main generator with respect to the line, as controlled by the phase shifter, is such as to limit the load assumed by the generator to a value within its capacity. From the point of view of a position regulator and referring to Fig. 4, torque can be developed by the prime mover only if $E_B$ is retarded with respect to $E_A$. Let this angle be $\theta_1$. Then $$T = S\theta_1$$

where T represents the torque and S represents the stiffness factor of the position regulator. It follows from a consideration of the generator that power can be delivered to the line only if $E_g$ is advanced with respect to $E_A$. The phase shifter serves to advance $E_g$ with respect to $E_B$ by the angle $\theta_0$ so that $E_g$ will lead $E_A$ by the angle $\theta_2 = \theta_0 - \theta_1$. The generator load imposes a torque on the prime mover approximately proportional to $\theta_2$, and this torque must be the same as that developed by virtue of the regulator action. Thus, in terms of $\theta_2$ the torque is $$T = Sg\theta_2 = Sg(\theta_0 - \theta_1) = Sg\left(\theta_0 - \frac{T}{S}\right)$$

where $Sg$ is the electrical or synchronizing stiffness of the alternator AL. Solving for T in terms of $\theta_0$.

$$T = \frac{\theta_0}{\frac{1}{S} + \frac{1}{Sg}} = \frac{SSg}{S+Sg}\theta_0 = Sn\theta_0$$

where $Sn$ may be termed the net stiffness.

These considerations show that the loading can be varied either by changing the angle of advance $\theta_0$ between the generator and phase shifter voltages or by changing the regulator stiffness S. The potentiometer R serves to adjust S.

Figure 8:
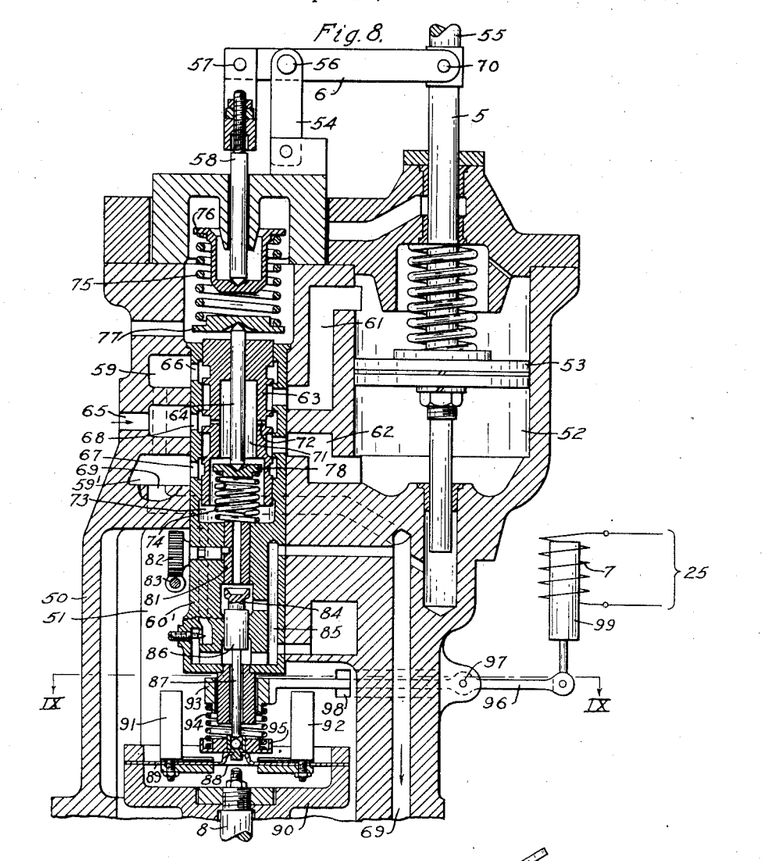
Fig. 8 is an axial section through a governor as used in the system according to Fig. 1.
Figure 9:
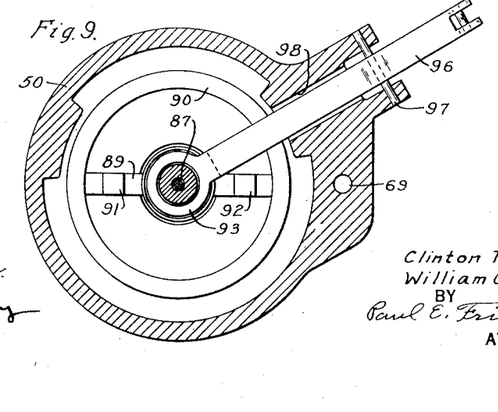
Fig. 9 is a cross-section through the same governor along the plane denoted by the dot and dash line IX—IX in Fig. 8.
Figures 10, 12:
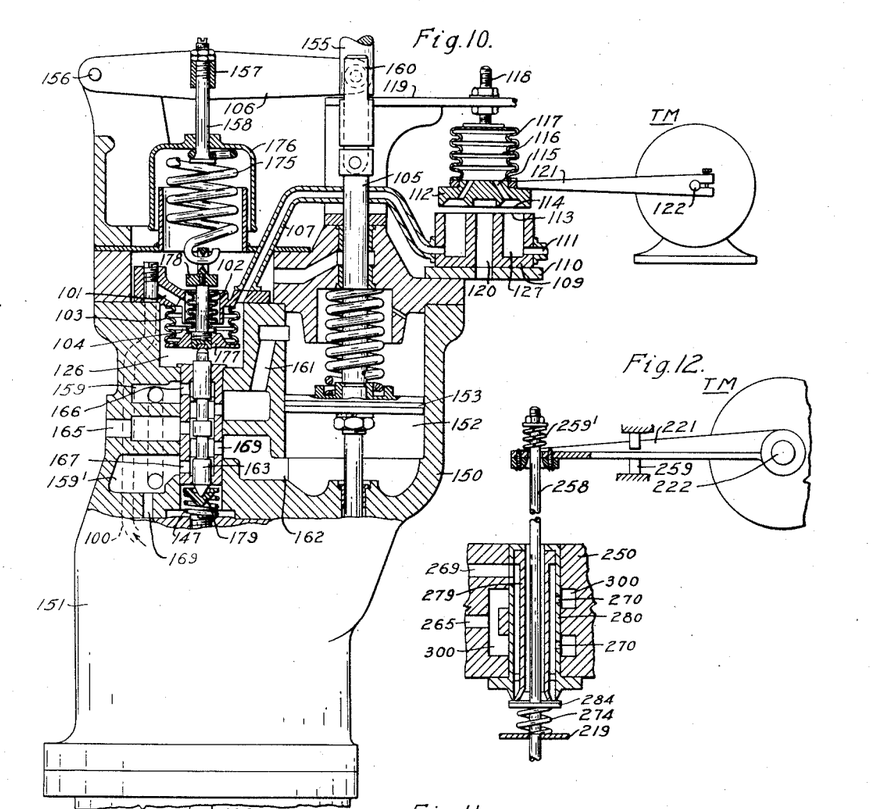
Fig. 10 represents a different form of a governing apparatus, partly in a lateral view and partly in section, this apparatus containing an electric torque motor for effecting a phase-responsive control of the prime mover.
Fig. 12 shows still another embodiment of a governor for effecting a torque responsive position control by means of a torque motor.

As in any position regulator where time delays are present, it is necessary to provide an antihunting stimulus to prevent instability. A corrective torque proportional to the rate of change of position is known to have a powerful stabilizing effect. Hence, in accordance with one of the aforementioned aspects of the invention, we prefer making use of the speed responsive control function of the customary commercial type turbine governors in order to obtain the desired antihunting effect. To this end and in accordance with our invention an electromagnetic drive is added to a speed governor of otherwise known construction so that the primary valve of the speed governor becomes responsive to the phase angle, it being already responsive to rate of change of angle. The system shown in Fig. 1 is of the type just mentioned and the necessary connection between the phase-responsive control elements and the speed-responsive devices of the governor will be understood from the description of Figs. 8 through 10 given in a later place.

The arrangement shown in Fig. 2 is useful for proportioning the load among several generators in a single power station. If, however, a fault were to occur on the line, the proper phase relation between the generator and system voltages would no longer be maintained, so that if the line were suddenly restored, the generators might momentarily assume excessive loads creating a disturbance on the system. To prevent this we propose transmitting the reference voltage with which $E_B$ is to be matched from the remote end of the line by means of carrier circuit, such as is shown in Fig. 7 and will be described hereinafter. The carrier current receiver may be provided with an automatic volume control to maintain essentially constant output during switching and fault transients. With this arrangement a proper phase is maintained even during short-circuit and open-circuit conditions, and the generators will immediately assume their prescribed loads when the original condition of the line is restored.

If the reference voltage for one or more of the generators of the system is obtained from an accurate tuning fork or quartz crystal oscillator, the frequency of the system will be as constant and accurate as the reference frequency and will be entirely independent of load variations.

When generators are regulated in this manner from an independent reference, it is possible to dispense with the phase shifters. The division of load is then controlled by varying the regulator stiffness. Generators thus regulated will divide system load changes in proportion to their net stiffnesses as shown by the following analysis for two generators supplying an isolated system.

Referring to the vector diagrams of Figs. 5 and 6 in which the generator and pilot voltages are shown in phase, the torques in terms of the generator stiffnesses are $$T_1 = Sg_1\beta_1$$
$$T_2 = Sg_2\beta_2$$

In terms of the regulator stiffnesses the torques are $$T_1 = S_1\alpha_1$$
$$T_2 = S_2\alpha_2$$

$\theta$ is the same for both machines since $E_{Ref}$ and $E_{line}$ are identical for the two machines. Therefore, $$\beta_1 + \alpha_1 = \beta_2 + \alpha_2$$

or $$\frac{T_1}{Sg_1} + \frac{T_1}{S_1} = \frac{T_2}{Sg_2} + \frac{T_2}{S_2}$$

from which $$\frac{T_1}{T_2} = \frac{\frac{1}{S_1} + \frac{1}{S_{1g}}}{\frac{1}{S_2} + \frac{1}{Sg_2}} = \frac{\frac{S_1 Sg_1}{S_1 + Sg_2}}{\frac{S_2 Sg_2}{S_2 + Sg_2}} = \frac{Sn_1}{Sn_2}$$

The addition of phase shifters with unequal angles to the regulating systems will modify the load division from the simple relation given above by an amount corresponding to the difference in the phase angles.

Generators regulated from the line as in Fig. 2 will deliver constant load regardless of system load changes. Thus in a system employing both types of reference, the machines controlled from the independent source will absorb all load changes unless manual adjustments are made to those regulated from the line. The independently regulated machines should, therefore, have sufficient capacity to handle sudden load changes.

When regulator stability limitations or other considerations require the use of a regulator stiffness insufficient to load a generator to its capacity, we propose to effectively increase the input angle $\theta_0$ to values considerably greater than 90° by making the frequency of the reference voltage and of the pilot generator a submultiple of the system frequency. Then 90° of the reference frequency will be equivalent to several times 90° of the system frequency and the input angle can be "cranked up" until the generator takes the maximum load required. With this arrangement the generator must have zero phase angle with respect to the line before it is connected to the line. It is not possible to preset the loads before the generators are put on the line as is the case with a stiffer system.

We have found that a position regulated generator is more stable when on the line than when off. It is possible to take advantage of this fact in a situation where low stiffness is required, by using a low stiffness during synchronizing and then increasing the stiffness for load dividing purposes when the generator is on the line. This may be done either manually by adjusting the potentiometer R or automatically by means of a relay circuit actuated by the closure of switch 14 and effecting, for instance, also a regulation of the potentiometer R.

An embodiment of a control system using for phase control a combination of reference voltages, both from the line and from a carrier circuit, is represented in Fig. 7. In this figure, the alternator AL connected to the turbine ST by shaft 1 in the same manner as in the preceding embodiment feeds the leads 11, 12 and 13 of the line through a switch 14 also in accordance with the system of Fig. 2. Similarly, the pilot generator PG driven from shaft 10 is connected to a phase shifter PS. The output leads of the phase shifter are denoted by 41, 42 and 43, respectively. They are connected with impedance members 44, 45 and 46, respectively, arranged as a Scott-connected transformer.

The resistor 47 of a potentiometer R1 is connected between leads 12 and 43 while lead 13 is in direct connection with lead 42. A section of resistor 47 is connected to a contactor 14' connected with switch 14 so that the section is shorted when switch 14 is open. The output circuit of R1 is connected to the impedance member 44 and includes in series the control coil 22 of a voltage regulator and the output circuit of another potentiometric rheostat R2. The resistor 30 of R2 is series-arranged in a carrier circuit CC together with the secondary of a transformer 60 connected across the output leads 42 and 43 of the phase shifter PS. It is to be understood that the control coil 22 is part of a voltage regulator which controls the adjustment of the admission valve of the turbine in a manner and by means of devices analogous to those of the system shown in Fig. 2.

The phase control effected by this system is in substance similar to the operation of the system previously described except that the control function is not only dependent on the potentiometer voltage $E_R$ but is also determined by the current supplied by the carrier circuit CC in accordance with another control magnitude, in particular the phase position of the line voltage at a remote end of the line.

Referring to the voltage notations $E_{A1}$, $E_{A2}$, $E_{B1}$, $E_{B2}$, $E_{R1}$, $E_{R2}$ and $E_Q$ entered in Fig. 7, the following advantages of this system will be understood.

With this arrangement it is possible to synchronize from the line with $E_{R1}$ set for maximum permissible off-the-line stiffness and $E_{R2}$ set for somewhat lower stiffness. $E_{R1}$ is then increased automatically by contactor 14' when connecting the generator to the line. With $E_{R1}$ large compared to $E_{R2}$, the potentiometer R2 operation will be overpowered by that of R1. With this arrangement $E_{R2}$ will assume control if the line opens or shorts. Synchronism will therefore be maintained during failures of either the power line or carrier circuit, provided the other is operative.

Figs. 8 and 9 exemplify one type of constructive means provided between the control solenoid 7 and the turbine admission valve 31 schematically represented in Fig. 2.

In Fig. 8 the elements denoted by numerals 5, 6, 7 and 50 are identical with the corresponding elements in Fig. 1, that is, the piston rod 5 of the servomotor device as shown in Fig. 8 is connected at its upper end 55 to the operating lever 3 indicated in Fig. 1 and hence to the valve stem 2 of the turbine admission valve 31 in Fig. 2. The coil 7 in Fig. 8 is energized by the electric phase-responsive control system according to Fig. 2 and serves to control the motion of the servomotor piston rod 5. The operative connection between coil 7 and piston rod 5 is established by the means described in the following.

The housing 50 of the governing apparatus has a number of hollows, a relatively large one being provided in the base portion of the apparatus and denoted by 51, while another relatively large space, at 52, forms the cylinder of the servomotor and contains a piston 53 mounted on the piston rod 5 to be acted upon by the motive fluid, for instance oil, of the hydraulic control system. When moving in the upward direction, the piston actuates through piston rod 5 the operating lever 3 (Fig. 1) so as to increase the effective cross section of the opening controlled by the admission valve of the turbine. When moving in the downward direction, the piston 53 and rod 5 rotate the lever 3 in the opposite direction and hence move the admission valve of the turbine towards the closed position. The rod 5 is also linked, at 70, to a follow-up lever 6 which is fulcrumed at 56 to a link 54 connected to a portion of the housing 50. A rod 58 is pivoted at 57 to the other end of the follow-up lever 6 and serves to actuate a follow-up spring mechanism to be described in a later place.

The upper space of the servomotor cylinder 52 communicates through a duct 61 with a pilot valve. Similarly the lower space of cylinder 52 is connected by a duct 62 with the same pilot valve. The valve comprises a valve piston 63 with a number of lands and ports for connecting the ducts 61 and 62 with admission and discharge ducts. The piston 63 is slidably arranged in a stationary member 60'. The hydraulic fluid is supplied under constant pressure through an inlet duct 65. Discharge ducts 66 and 67 open into discharge spaces 59 and 59', respectively, which are in communication with each other and connected with a discharge duct 69.

When the piston 63 of the pilot valve is in the illustrated neutral position, both ducts 61 and 62 of the servomotor are closed so that the fluid pressure supplied at 65 is ineffective as regards the motion and control of the servomotor piston 53. When the pilot piston 63 is in raised position, the inlet duct 65 is connected through the opening 66 and a port portion of the pilot piston with the upper duct 61 so that hydraulic pressure acts on the upper surface of the servomotor piston 53. In the same position of the pilot valve, the lower duct 62 of cylinder 52 is connected with discharge space 59' and hence with discharge duct 69; consequently, the motive fluid is permitted to escape from the lower chamber of the servomotor cylinder. As a result, the piston 53 is moved in the downward direction.

When the pilot piston 63 is lowered from the illustrated neutral position, the upper duct 61 of the servomotor is connected through opening 66 with discharge space 59 and hence through discharge space 59' with the discharge duct 69. At the same time, the lower duct 62 of the servomotor is connected through opening 68 with the inlet duct 65. Consequently, the motive fluid now exerts pressure on the lower side of piston 53 while fluid may escape from the upper cylinder chamber. As a result, the piston 53 is now moved in the upward direction in order to adjust the turbine admission valve accordingly.

The just-mentioned displacements of the pilot piston 63 are also effected by hydraulic pressure. To this end, the piston 63 has a hollow 71 in communication with the inlet duct 65 through metering orifices 72. Due to this connection, a hydraulic pressure is effective in space 71 and in the adjoining space 73 of member 60'. As will be explained hereinafter, this pressure is controlled by the phase-responsive and speed-responsive control elements of the apparatus.

The pilot piston 63 is firmly connected with a pin 64 which engages an upper abutment 77 and a lower abutment 78. A spring 74 is arranged between the lower abutment 78 and member 60', and another spring 75 is placed between abutment 77 and a cup-shaped member 76 which rests against the lower tip of rod 58. When the pilot piston 63 is in the illustrated neutral position, the force of spring 75 acting against abutment 77 and pin 64 is balanced by the combined forces of spring 74 and of the pressure acting in chamber 73. When the pressure in chamber 73 is increased by the governing means to be described presently, the raising force on the piston and pin structure 63, 64 predominates so that the piston 63 is raised. Conversely, when the pressure in chamber 73 is sufficiently lowered, the pressure of spring 75 prevails and forces the pilot piston 63 into a lower position.

A tubular plug 81 is arranged with a close sliding fit in the center bore of member 60'. Plug 81 is engaged by an eccentric which is connected with a worm gear 82 meshing with a worm shaft 83. The shaft is provided with operating means (not illustrated) which can be actuated from the outside so as to raise and lower the plug 81 relative to member 60'. The lower opening of the bore in plug 81 opens into a discharge space which communicates through a duct 85 with the discharge duct 69. A relay valve is provided for restricting the annular discharge opening at the lower end of the tubular plug 81. The valve contains a cup 84 attached to a plunger 86 which engages the member 60' by a close sliding fit. A depending valve stem 87 is attached to the plunger 86.

The connection of the pressure chamber 73 through the bore of plug 81 and the discharge opening controlled by the cup 84 with the discharge duct 69 forms a by-pass to the main hydraulic conduit system and relieves the pressure effective in chamber 73 to a degree depending upon the cross-section of the annular discharge opening between plug 81 and cup 84. Hence, when cup 84 is in raised position with the annular discharge opening fully or nearly closed, the pressure in chamber 73 is at a maximum. This pressure is so rated, by properly dimensioning the metering orifices and the two springs 74 and 75 relative to the flow quantity or pressure of the fluid supply, that the lifting forces on the pilot piston 63 predominate and hence causing pilot valve to operate the servomotor piston 53 so as to move downwardly thereby adjusting the admission valve of the turbine to a more fully closed position. On the other hand, if the cup valve 84 is opened, a larger proportion of the pressure effective in chamber 73 is relieved by the escape of motive fluid through the plug 81 and the ducts 85 and 69. Consequently, the pressure of spring 75 now prevails over the forces exerted by spring 74 and the remaining hydraulic pressure in chamber 73 so that the pilot piston 63 is caused to drop. This has the effect of raising the servomotor piston 53 and hence moving the turbine admission valve towards opening position. The illustrated neutral position of the pilot piston 63 is maintained only while the cup valve 84 is in a given distance from the tubular body 81. In this position the servomotor is at rest so that the turbine admission valve maintains its adjustment and the turbine runs at a constant speed.

The lower end of the valve stem 87 rests against the upwardly bent central portion 88 of a leaf spring 89 whose ends are attached to a drum structure 90 firmly mounted on the governor shaft 8. Two fly-weights 91 and 92 are attached to the leaf spring 89. A bushing 93 is slidably arranged on the lower depending portion of the stationary member 50' and serves as an abutment for a spring 94 whose other end rests against an abutment 95 attached to the center portion 88 of the leaf spring 89. A lever 96, fulcrumed at 97 and extending through an opening 98 in the casing 50 of the apparatus, is connected to the bushing 93 with a roller bearing or the like rotatable engagement provided between the lever 96 and the bushing 93. The exterior end of lever 96 is linked to the armature 99 of the control coil 7.

Due to its connection with the turbine shaft 10, the drum structure 90 and the attached fly-weight structure rotate together with the governor shaft 8 at a speed proportional to that of the turbine to be governed. When rotating, the centrifugal force acting on the fly-weights 91 and 92 tends to force the upper ends of these weights away from each other and to bend the center portion 88 of the leaf spring 89 in the upward direction. Then the valve stem 87 is also forced upwardly together with the plunger 86 and the valve cup 84. Consequently, the discharge area of the cup valve is decreased with increasing speed of the governor and vice versa.

Assuming that the turbine has been running at constant speed with the cup 84 and the pilot piston 63 in the illustrated neutral position, an increase in the turbine speed will cause the pressure in chamber 73 to increase accordingly, and hence to raise the pilot piston 63. As explained previously, this has the effect of causing the servomotor piston 53 to reduce the effective opening of the admission valve. This reduces the speed of the engine and counteracts the original increase in speed. Thus, the speed-responsive elements of the governing apparatus have the tendency to control the turbine operation for constant speed and hence the alternator AL for constant frequency of its output voltage.

The moving force acting on the cup valve, however, is also dependent on the adjustment of the spring 96. Since the upper abutment of this spring is movable and assumes a position corresponding to the energization of the control coil 7, the resultant control motion applied to the cup valve is also dependent upon the phase displacement measured by the electric circuit arrangement attached to control coil 7 and described in the foregoing with reference to Fig. 2 or Fig. 7.

The motion of the servomotor piston 53 is transmitted through the lever 6 and the elements 68 and 76 to the spring 75 of the follow-up mechanism. As a result the force of spring 75 acting against the abutment 77 is changed until this change is sufficient to compensate for the change in the transformed pressure in chamber 73. As soon as such compensation is achieved, the pilot piston 68 is returned to its neutral position thereby stopping the further motion of the servomotor and admission valve. At the end of the control operation, the adjustment of the valve is readjusted in accordance with the load variation which caused the change.

Since the pressure in chamber 73 required for maintaining the pilot piston in neutral position is determined by the distance of the cup 84 from the plug 81 at the datum speed to be kept constant, the speed of the turbine can be regulated by adjusting the axial distance of the tubular plug 81 from the valve cup 84. As explained in an earlier place, such an adjustment is effected by means of the eccentric actuated by gears 82 and 83. Therefore, in order to set the datum value of the turbine speed to a desired magnitude or to regulate the frequency of the alternating current generated by the alternator, a corresponding adjustment of element 83 is required.

While the foregoing embodiment of a governing apparatus in accordance with our invention exemplifies a case in which the phase-responsive position regulator acts on the fly-weight mechanism of a speed governor, it will be understood that the control effect may also be introduced into the governing system at another suitable location and if desired without dependence upon the operation of the speed-responsive elements proper. For instance, the arrangement shown in Fig. 10 represents an embodiment in which the phase-responsive control effect is applied to the follow-up mechanism of a speed governor with the aid of a separate, phase controlled pressure transformer.

In Fig. 10, the housing and main supporting structure of the governing apparatus is denoted by 150. The housing forms a servo-motor cylinder at 152. The piston 153 of the servomotor is mounted on a piston rod 105 which has its upper end 155 connected to the admission valve of the turbine, for instance, by means of a lever connection similar to the one illustrated in Fig. 1. A follow-up lever 106 is linked to the piston rod 105 at 160 and is journaled at 156 to a stationary support. A connecting rod 158 is linked to lever 106 at 157 and serves to actuate the spring of a follow-up mechanism.

A vertical governor shaft 108 is coupled with the turbine shaft in a manner similar to the coupling between shafts 8 and 10 in Fig. 1. The lower portion 151 of the governing apparatus houses a pressure transforming or pressure generating device operated by the shaft 108 and supplying its output pressure to a conduit or duct 100. The device may consist of a centrifugal governor in combination with a relay transformer of the type shown in Fig. 8, or of a centrifugal pump. In either case the fluid pressure supplied to conduit 100 varies in accordance with the turbine speed applied to shaft 108.

Conduit 100 communicates with an inlet duct 101 which opens into an annular chamber 104 formed between two expansible bellows 102 and 103. The lower ends of these bellows are connected and sealed by means of a rigid abutment plate 177 which is connected with an attachment 178. A tension spring 175 is attached between member 178 and the connecting rod 158 and protected by a cover 176. The space 126 enclosing the bellows 103 is connected through a conduit 107 with the annular space 127 of a hollow member 109 which forms part of the phase-controlled pressure transformer and is mounted on a support 110 rigidly connected with the housing and supporting structure 150 of the governing apparatus.

A pressure supply conduit 111 opening into chamber 127 of body 109 is connected to a source of constant hydraulic pressure. The upper opening of the transformer body 109 is controlled by a valve member 112 which is designed as a double-cup. That is, the valve member 112 has an inner projecting edge 113 cooperating with an inner tubular portion of body 109, while an outer projecting edge 114 is provided for cooperating with the outer edge of body 109.

Valve member 112 is attached to a bellows 117 and has ducts 115 connecting the interior 116 of the bellows with the annular space at the lower surface of valve member 112 between the two edges 113 and 114. The bellows 117 is sealed with the exception of the ducts 115 and is rigidly attached to a bolt 118 which is adjustably mounted on a support 119. This support is rigidly secured to the housing 150 of the governing apparatus. An arm 121 connects valve member 112 with the shaft 122 of a torque motor TM.

The space in cylinder 152 above piston 153 communicates through a duct 161 with a pilot valve. A similar duct 162 is provided between the lower cylinder space and the same valve. The pilot valve has a piston 163 with appropriate lands and ports for controlling the supply of motive fluid from a supply duct 165 to either duct 161 or 162. 166 and 167 denote discharge ducts which opens into respective discharge chambers 159 and 159'. The two chambers 159 and 169' communicate with each other and are connected with a discharge conduit 169.

The upper end of the pilot piston 163 rests against the abutment plate 177. The lower end rests similarly against an abutment 179 which is supported by a spring 147 serving to keep the valve piston 163 in engagement with the abutment plate 177 regardless of a displacement of plate 177.

In the illustrated neutral position of the pilot valve the pressure supply duct 165 is closed so that no pressure is applied to the servomotor piston 153. Hence no control effect is exerted on the servomotor.

The speed responsive variable pressure supplied through conduit 100 and duct 101 to the inner chamber 104 of the bellows structure tends to expand the bellows and to move the abutment plate 177 in the downward direction. The follow-up spring 175 acts on plate 177 in the opposite direction, as does the pressure supplied through conduit 187 to the chamber 106 surrounding the bellows. The pressure in chamber 126 depends on the magnitude of the constant fluid pressure supplied through the inlet conduit 111 of the pressure transformer but is only a fraction of this pressure because the fluid supplied to the transformer chamber 127 can partly escape through the opening controlled by the cup member 112. When member 112 is in partially open position, as illustrated in Fig. 10, part of the fluid supplied through 111 into chamber 127 will escape through the center bore 120 of the transformer body 109, while another part will escape over the outer rim of the body 109. If member 112 is moved towards body 109 due to the action of the torque motor TM and in opposition to the elastic force inherent in bellows 117, the ratio between the supply pressure and the pressure relief will increase so that the fluid pressure supplied through conduit 107 into chamber 106 increases accordingly. Conversely, if valve member 112 is moved away from transformer body 109, the ratio decreases and the pressure in chamber 106 is lowered.

It will be seen from the foregoing description that the governing apparatus produces two superposed control effects. One effect is due to the speed-responsive variation in pressure effective in chamber 104 and produced by the speed governing portion of the apparatus, while the other effect is caused by the pressure in chamber 126 and produced by the torque controlled pressure transformer.

In order to obtain a phase-responsive position control of the turbine in accordance with the principles of our invention, it is necessary to operate the control motor TM in dependence upon the phase position of the generated alternating voltage produced by the turbogenerator relative to a suitable reference voltage. A control in accordance with these requirements can be obtained by connecting the torque motor with a measuring circuit built up similar to those shown in Figs. 2 and 7 for controlling the operation of coil 22. However, an operating circuit more suitable for the control of a torque motor is represented by Fig. 11.

Figure 11:
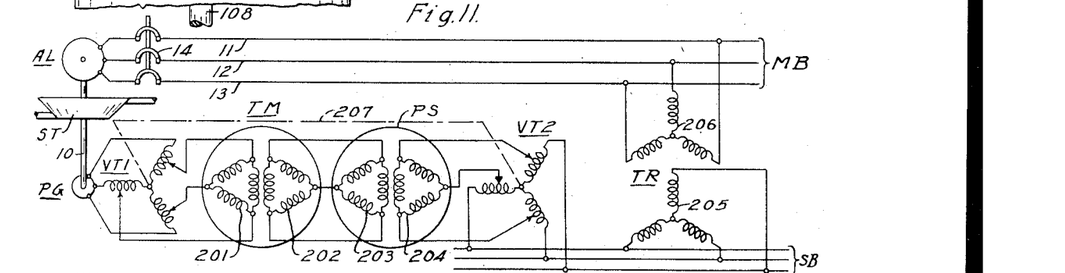
Fig. 11 shows a circuit diagram for operating the torque motor in governing apparatus of the type represented by Fig. 10.

According to Fig. 11, the steam turbine ST, alternator AL and pilot generator PG connected with one another by a common shaft 10, are comparable with the respective elements shown in Figs. 1, 2 and 7. The alternator AL, as in the preceding embodiments, is connected through a switch 14 with the leads 11, 12 and 13 of a main bus MB. The pilot generator PG has its output terminals connected through a variable transformer VT1 with a winding 201 of the torque motor TM. This motor consists of a wound rotor induction motor and has another winding 202 connected to the secondary 203 of a phase shifter PS whose primary 204 is connected through a second variable transformer VT2 with a station service bus SB. The service bus is fed from the main bus over a transformer TR, the secondary of this transformer being denoted by 205 and the appertaining primary by 206. If the voltages applied to windings 201 and 202 are equal in magnitude, the torque developed by motor TM is proportional to the sine of the phase angle between the corresponding phase voltages.

The illustrated provision of a phase shifter between at least one of the torque motor windings and its power supply has the advantage that it permits advancing the phase of the generated voltage of the main generator with respect to the bus voltage, and thus to provide a means of adjusting the generator load. The two variable transformers permit also a control of the voltages applied to the motor windings and hence of the torque developed by the motor. This affords a sensitivity or stiffness control for the position governor. Since a simultaneous control of the voltages to both motor windings is necessary to eliminate the unidirectional induction motor torque which would result in the motor for unbalanced voltages, the two variable transformers are ganged together. This is indicated schematically by the broken line connection denoted by 207.

Fig. 12 exemplifies another way of applying a torque motor for a phase-responsive control of a prime mover in accordance with this invention. The torque motor TM is operated by means of a phase-responsive control circuit as shown, for instance, in Fig. 11. The shaft 222 of the torque motor carries an arm 221 which is movable between two stops 259 and provided with a setup spring 259' in order to limit the maximum force which can be applied to the valve operated by the motor. The valve may consist of the primary relay transformer of the hydraulic control system, and if desired may also be acted upon by a speed-responsive governing mechanism so that speed control and position control function in parallel to each other as in the embodiments previously described.

The valve controlled by the torque motor according to Fig. 12 represents a modification of a cup-type control valve. The movable valve disk 284 is mounted on a tappet 258 connected with the torque motor arm 221 through the above-mentioned setup spring 259'. A relatively weak spring 274 underneath the valve member 284 rests against a stationary abutment 219. Two cylindric tubes 279 and 280 are arranged concentrically to the tappet 258. The lower edges of these two tubes form a restricted annular valve opening whose effective discharge area is controlled by the movable valve member 284. Motive fluid is supplied from a source of constant pressure through the duct 269 into the space between the two tubes 279 and 280. This space is connected through orifices 270 with two annular chambers 300 which are formed in the stationary body or casing 250 of the valve mechanism. The chambers 300 communicate with each other and are connected with a duct 265 leading to the pilot valve of a servomotor for controlling the admission valve of the prime mover.

The pressure supplied from inlet conduit 269 through the relay valve and the outlet duct 265 to the servomotor depends on the discharge area of the escape orifice controlled by the movable member 284. When member 284 is close to the edges of tubes 279 and 280, relatively little fluid escapes so that the pressure in duct 265 is correspondingly high. Conversely, if member 284 is farther removed from the valve tubes, a greater portion of fluid is discharged so that the pressure in duct 265 is lowered. Consequently, when the torque motor is caused to turn its arm 221 upwardly due to a lagging behind of the alternator phase position relative to the reference phase, the pressure transmitted through the relay transformer to the servomotor will cause the latter to open the steam admission valve of the prime mover. The prime mover and generator will then advance in phase and deliver a correspondingly increased load.

When combined with a speed governor, the use of a torque motor type of drive for the primary relay transformer of the governor system has the important advantage over other types that if either source of power for the torque motor fails, the regulating system will revert to an ordinary speed governor without serious disturbances in speed.

In order to maintain a satisfactory stability of control in phase-responsive governor systems according to the invention, it is preferable to keep the time constants of the governor mechanisms at a minimum and to operate with a low droop of the governor speed characteristic by adjusting the hydraulic pressure valves and the springs and masses of the governor mechanisms accordingly. For instance, a servomotor time constant of about 0.1 second or less may be chosen, by selecting a proper stiffness of the follow-up spring, if necessary. A low time constant of the speed-responsive relay transformer, for instance of less than 0.1 second, is also desirable. This time constant can be obtained by increasing the average flow of motive fluid through the transformer valve. A favorable droop of the governor speed characteristic, for instance, is 3% to 1%. The masses of the flyweights and the discharge area of the speed controlled relay transformer should be dimensioned accordingly. In other words, the invention, though fundamentally not limited to or predicated upon any particular time constant of the governing mechanisms, can be applied to best advantage with governing apparatus in which the time delay between the occurrence of a control impulse in the primary control valve and the execution of the corresponding operation by the servomotor is at a minimum. Therefore, if desired, accelerating devices such as the acceleration-responsive anticipator systems described in the copending application Serial No. 502,490, filed September 15, 1943, by C. R. Hanna and S. J. Mikina on "Acceleration responsive governors for prime movers," may be used to advantage together with phase-responsive position regulators according to the present invention.

We claim as our invention:

1. In apparatus for controlling the motive fluid admission valve of a prime mover driving a generator for an alternating current system, force-responsive means for operating the admission valve, means providing a first alternating current voltage whose phase relation with respect to rotational movement of the prime mover is fixed irrespective of generator load, means providing a second alternating current voltage serving as a reference voltage, electrical means responsive to the phase angle between said first and second voltages to provide a first controlling force, and means including a governing system providing a second controlling force responsive to speed of the prime mover and utilizing said first and second controlling forces to control the operation of the force-responsive means.

2. In apparatus for controlling the motive fluid admission valve of a prime mover driving a generator for an alternating current system, force-responsive means for operating the admission valve, means providing a first alternating current voltage whose phase relation with respect to rotational movement of the prime mover is fixed irrespective of generator load, means providing a second alternating current voltage serving as a reference voltage, a motor for developing torque in response to the phase angle between said first and second voltages to provide a first controlling force, and means including a governing system providing a second controlling force responsive to speed of the prime mover and utilizing said first and second controlling forces to control the operation of said force-responsive means.

3. In apparatus for controlling the motive fluid admission valve of a prime mover driving a generator for an alternating current system, force-responsive means for operating the admission valve, means providing a first alternating current voltage whose phase relation with respect to rotational movement of the prime mover is fixed irrespective of generator load, means providing a second alternating current voltage serving as a reference voltage, a phase shifter utilizing one of said first and second voltages to provide a secondary voltage, electrical means responsive to the phase angle between said secondary voltage and the other of said first and second voltages to provide a first controlling force, and means including a governing system providing a second controlling force responsive to speed of the prime mover and utilizing said first and second controlling forces to operate the force-responsive means to control the admission of motive fluid to the prime mover.

4. Apparatus as claimed in claim 3 wherein, to provide for load control operation, the governing system includes a speed changer by means of which the connected prime mover and generator are brought up to synchronous speed at no load incident to connection of the generator to the alternating current system.

5. In apparatus for controlling a generator for an alternating current system and which is driven by a prime mover, a pilot generator positively driven by the prime mover so that the alternating current voltage thereof has a phase relation with respect to rotational movement of the prime mover which is fixed irrespective of the main generator load, means providing an alternating current reference voltage, and electrical means connected to the output winding of the pilot generator and to the last-named means and responsive to the phase angle between the pilot generator and reference voltages to control the admission of motive fluid to the prime mover.

6. In apparatus for controlling the motive fluid admission valve of a prime mover driving a generator connected to an alternating current system, a pilot generator driven by the prime mover, a phase shifter interposed between the pilot generator and the system, and means for controlling the admission valve in response to the pilot generator and system voltage phase relation introduced by the phase shifter.

7. In apparatus for controlling the motive fluid admission valve of a prime mover driving a main generator for an alternating current system, force-responsive means for operating the admission valve, a pilot generator positively driven by the prime mover so that a first alternating current voltage generated thereby has a phase relation with respect to rotational movement which is fixed irrespective of main generator load, means providing a second alternating current voltage serving as a reference voltage, a phase shifter utilizing one of said first and second voltages as primary voltage to provide a secondary voltage, electrical means responsive to the phase angle between the secondary voltage and the other of said first and second voltages to provide a first controlling force, and means including a governing system providing a second controlling force responsive to speed of the prime mover and utilizing said first and second controlling forces to operate the force-responsive means to control the admission of motive fluid to the prime mover.

8. In apparatus for controlling the motive fluid admission valve of a prime mover driving a generator for an alternating current system, force-responsive means for operating the admission valve, a pilot generator positively driven by the prime mover, a carrier circuit, a phase shifter utilizing pilot generator voltage to provide a secondary voltage, electrical means responsive to the phase angle between said secondary and the carrier circuit voltages to provide a first controlling force, and means including a governing system providing a second controlling force responsive to speed of the prime mover and utilizing said first and second controlling forces to control the operation of said force-responsive means.

9. In apparatus for controlling the motive fluid admission valve of a prime mover driving a generator for an alternating current system, force-responsive means for operating the admission valve, means providing a first alternating current voltage whose phase relation with respect to rotational movement of the prime mover is fixed irrespective of generator load, means providing a second alternating current voltage serving as a reference voltage, electrical means responsive to the phase relation of the first and second voltages to provide a first controlling force, means providing a second controlling force which is a function of prime mover speed, and means for amplifying said first and second controlling forces and utilizing the amplified forces to operate the force-responsive means.

10. In apparatus for controlling the load of a generator which is connected to an alternating current system and is driven by a prime mover provided with a motive fluid admission valve controlled by force-responsive means, means providing an alternating current voltage whose phase relation with respect to rotational movement of the prime mover is fixed irrespective of generator load, electrical means operative to provide a first force which is a function of the phase relation of said voltage with respect to the system voltage, means providing a second force which is a function of prime mover speed, and liquid pressure means operative to amplify said first and second forces and utilizing the amplified forces to control the force-responsive means so that motive fluid is supplied to the prime mover to regulate the load carried by the generator.

11. In apparatus for controlling the load of a generator which is connected to an alternating current system and is driven by a prime mover provided with a motive fluid admission valve operated by force-responsive means, means providing an alternating current voltage whose phase relation with respect to rotational movement of the prime mover is fixed irrespective of generator load, a phase shifter utilizing one voltage of the pair including the aforesaid voltage and the system voltage as primary voltage to provide a secondary voltage, electrical means providing a first controlling force in response to the phase angle between said secondary voltage and the other voltage of said pair, means providing a second controlling force which is responsive to prime mover speed, means for amplifying said first and second forces and utilizing the amplified forces to control the force-responsive means, and means for adjusting the amplifying means to change the responsiveness thereof to the second controlling force so that, for the load range of the prime mover and generator, the amplifying means may operate for load control with the adjusting means set for no load at synchronous speed.

12. In apparatus for controlling the load of a generator arranged for connection and disconnection with respect to an alternating current system and which is driven by a prime mover provided with force-responsive means for controlling the admission of motive fluid thereto, a pilot generator, a carrier circuit, a phase shifter utilizing pilot generator voltage to provide secondary voltage, electrical means responsive either to the phase angle between the secondary voltage and the system voltage or to the phase angle between the secondary voltage and the carrier circuit voltage to provide a first controlling force, means including a governing system providing a second controlling force responsive to speed of the prime mover and utilizing said first and second controlling forces to control the force-responsive means, and means responsive to connection of the generator to the system to render the electrical means effective in response to the phase angle between the secondary and system voltages and responsive to disconnection of the generator from the system to render the electrical means effective in response to the phase angle between the secondary voltage and the carrier circuit voltage.

13. In apparatus for controlling the motive fluid admission valve of a prime mover driving a generator for an alternating current system, force-responsive means for operating the admission valve, means providing a first alternating current voltage whose phase relation with respect to rotational movement of the prime mover is fixed irrespective of generator load, means providing a second alternating current voltage serving as a reference voltage, a phase shifter utilizing one of said first and second voltages to provide a secondary voltage, potentiometric means having said secondary voltage and the other of said first and second voltages applied thereto to provide an output voltage, means utilizing said output voltage to produce a first controlling force dependent thereon, and means including a governing system providing a second controlling force responsive to speed of the prime mover and utilizing said first and second controlling forces to control the operation of said force-responsive means.

14. In apparatus for controlling the load of a generator which is connected by a switch to an alternating current system and is driven by a prime mover provided with force-responsive means for controlling the admission of motive fluid thereto, means providing an alternating current voltage whose phase relation with respect to rotational movement of the prime mover is fixed irrespective of generator load, a carrier circuit, a phase shifter utilizing said voltage to provide a secondary voltage, first potentiometric means having said secondary voltage and the voltage of said system applied thereto to provide a controlling voltage, second potentiometric means having said secondary voltage and said carrier circuit voltage applied thereto to provide a controlling voltage, means utilizing either of the controlling voltages to provide a first controlling force, means including a governing system providing a second controlling force responsive to speed of the prime mover and utilizing said first and second controlling forces to control said force-responsive means, and means responsive to operation of said switch to connect the generator to said system so that the first potentiometric means may overcome the second potentiometric means in providing the controlling voltage and responsive to disconnection of the generator from the system so that the second potentiometric means may overcome the first potentiometric means to provide the controlling voltage.

15. In apparatus for controlling the motive fluid admission valve of a prime mover driving a generator for an alternating current system, force-responsive means for operating the admission valve, means providing a first alternating current voltage whose phase relation with respect to rotational movement of the prime mover is fixed irrespective of generator load, means providing a second alternating current voltage serving as a reference voltage, a phase shifter utilizing one of said first and second voltages as primary voltage to provide a secondary voltage, potentiometric means including an output circuit and having said secondary voltage and the reference voltage applied thereto to develop output voltage for the output circuit, means utilizing one of said secondary and reference voltages to provide a quadrature voltage and for applying the latter to said output circuit to provide a voltage which is the resultant of the output and quadrature voltages, means utilizing the resultant voltage to provide a first controlling force corresponding thereto, and means including a governing system providing a second controlling force responsive to speed of the prime mover and utilizing said first and second controlling forces to control the operation of said force-responsive means.

16. In apparatus for controlling the load of a generator which is connected to an alternating current system provided with a three-phase line and which is driven by a prime mover provided with force-responsive means for controlling the admission of motive fluid thereto, means providing an alternating current voltage whose phase relation with respect to rotational movement of the prime mover is fixed irrespective of generator load, a phase shifter including a three-phase output line and utilizing one voltage of the pair including the aforesaid voltage and the system voltage as primary voltage to provide secondary voltage for the output line, potentiometric means having said secondary voltage and the other voltage of said pair impressed thereon to provide a controlling voltage, means connected to one of said three-phase lines to provide a quadrature voltage, means for combining the quadrature voltage and the controlling voltage so that the latter is added to or subtracted from the former to provide a resultant voltage, means utilizing the resultant voltage to provide a first controlling force dependent thereon, and means including a governing system providing a second controlling force responsive to speed of the prime mover and utilizing said first and second controlling forces to control the force-responsive means so as to admit motive fluid to the prime mover to drive the generator to regulate the load of the latter as determined by adjustment of the phase shifter.

17. In apparatus for controlling the motive fluid admission valve of a prime mover driving a generator for an alternating current system, means providing a first alternating current voltage whose phase relation with respect to rotational movement of the prime mover is fixed irrespective of generator load, means providing a second alternating current voltage serving as a reference voltage, means for controlling the motive fluid admission valve in response to the phase angle between said first and second voltages, and means for controlling the motive fluid admission valve in response to the rate at which said phase angle changes.

18. In apparatus for controlling the motive fluid admission valve of a prime mover driving a generator for an alternating current system, means providing a first alternating current voltage whose phase relation with respect to rotational movement of the prime mover is fixed irrespective of generator load, means providing a second alternating current voltage serving as a reference voltage, a phase shifter utilizing one of said first and second voltages as primary voltage to provide a secondary voltage, means for controlling the motive fluid admission valve in response to the phase angle between said secondary voltage and the other of said first and second voltages, and means including a governor responsive to speed of the prime mover for controlling the motive fluid admission valve in response to the rate at which said phase angle changes.

19. In apparatus for controlling the motive fluid admission valve of a prime mover driving a generator for an alternating current system, an alternating current pilot generator driven by the prime mover, a phase shifter utilizing voltage impressed thereon by the pilot generator to provide a secondary voltage, means providing an alternating current reference voltage, means responsive to the phase angle between said secondary and reference voltages to control said motive fluid admission valve, and means including a governor responsive to speed of the prime mover for controlling the motive fluid admission valve in response to the rate at which said phase angle changes.

CLINTON R. HANNA.
WILLIAM O. OSBON.